March 24, 1959 E. TURATI 2,878,581
DRYERS
Filed Nov. 13, 1956 3 Sheets-Sheet 1

INVENTOR.
ENRICO TURATI
BY Edward Thomas
ATTORNEY

March 24, 1959 E. TURATI 2,878,581
DRYERS
Filed Nov. 13, 1956 3 Sheets-Sheet 2
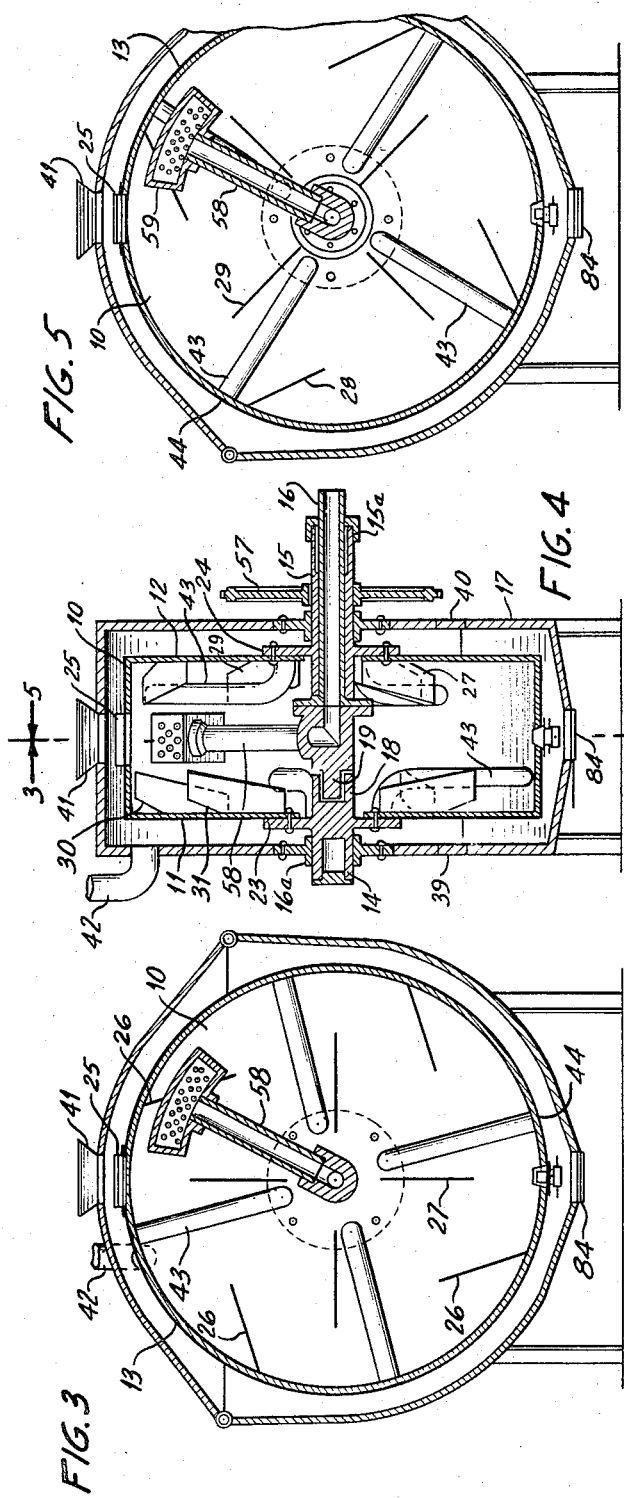
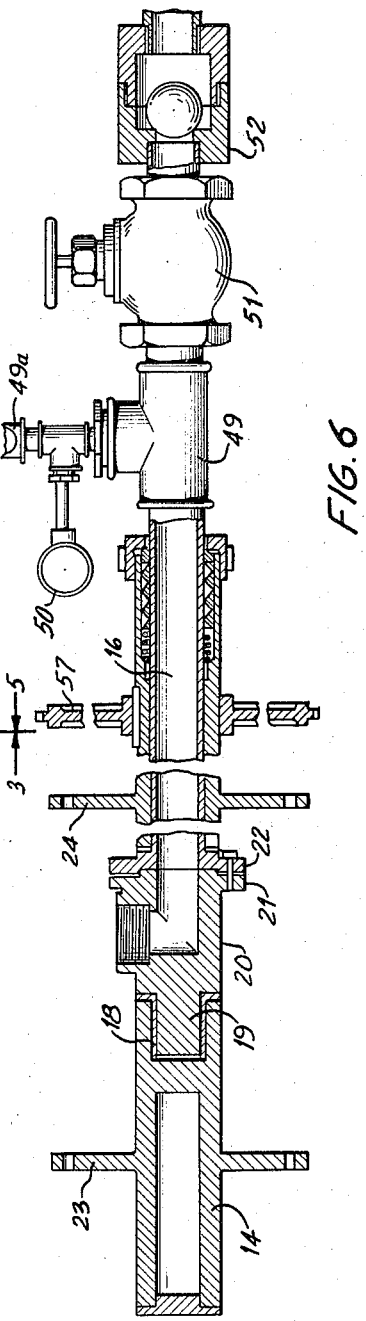
INVENTOR.
ENRICO TURATI
BY Edward Thomas
ATTORNEY INVENTOR.
ENRICO TURATI
BY Edward Thomas
ATTORNEY United States Patent Office 2,878,581
Patented Mar. 24, 1959

2,878,581

DRYERS

Enrico Turati, Armenia, Caldas, Colombia

Application November 13, 1956, Serial No. 621,658

5 Claims. (Cl. 34—92)

This invention relates to driers suitable for drying coffee beans and cereal grains. The first of the problems faced in drying such coarse materials in large quantities is the problem of achieving adequate heating without local overheating of some part of the load in the drier.

To attain these ends it is necessary that the drier keep the mass of material in motion and that adequate means be provided for heating the mass effectively and yet at a safely low temperature.

Hitherto in many places the coffee beans have been dried in heaps on cement floors in the sun, and often the heaps of beans have been continually turned over to assure even heating and prompt removal of the damp vapors resulting from heating, so that fermentation is either eliminated or exactly controlled.

According to the present invention the beans or cereal grains are heated in a rotating drier drum and are kept in constant agitation so as to continually bring fresh beans to the drying surface and remove the partially or completely dried beans before they become heated or have begun to ferment unfavorably.

In the form shown the drier drum rotates within a jacket, spaced a little, say a few inches therefrom, and the internal periphery of the drum carries vanes adapted to carry the beans part way around with the rotating drum and then drop them, so that the beans are rapidly separated from the drum surface. The drier may be provided with other vanes extending radially from near the axis and rotating with the drum preferably at angles different from the first mentioned vanes so as to further redistribute the beans.

Thus the beans are continually falling through the open interior of the drum. The interior is shown as also warmed by roughly radial pipes which carry warm air and are large enough to carry a considerable volume of the warm air so that the rotating drum by centrifugal action tends to circulate warm air through said pipes.

Removal of vapor laden air from the drum is shown as attained by a nearly radial pipe provided with a perforated enlarged head and connected to the hollow shaft so as to withdraw the vapor laden air from the drum as the drying proceeds. Usually the enlarged head stands near the top of the drum but clear of any access door which is used for putting beans into the drum when the access door stands at the top of its travel.

To insure thorough mixing of the contents of the drum the vanes, mentioned above, may be set at one angle adjacent to one side of the drum and at another angle or at an opposite angle adjacent to the other side of the drum, leaving space between the two sets of vanes for the aforesaid enlarged head, and also leaving space for radial vanes which are set on opposite sides of the pipes carrying the enlarged head and preferably staggered at different angles on opposite sides of said pipe.

The device preferably includes a small sampling opening for removing samples of the dried beans without breaking the vacuum.

The heating of the drum is shown as achieved by blowing hot air from an oil burner between the jacket and the drum; and the vacuum is shown as maintained by an ejector or other device connected through the hollow shaft.

To facilitate operation of the dryer in places remote from mechanical supplies and mechanical repair men, the vacuum is shown as maintained by a water-flow ejector connected to the hollow shaft, and the water leaving the ejector is shown as capable of being reused by a pump which returns used water to the ejector feed.

Other features and advantages will hereinafter appear.

In the accompanying drawings:

Fig. 3 is a largely diagrammatic sectional side view on the line 3—3 of Fig. 4 of the drier drum seen from the nearer side of the center;

Fig. 4 is a similar transverse side view mostly viewed from the near side of the center;

Fig. 5 is a diagrammatic sectional view like Fig. 3 but on the line 5—5 of Fig. 4 and but near the further edge of the drier;

Fig. 6 is a side view, mostly in section of the drier drum shaft system;

Figure 1:
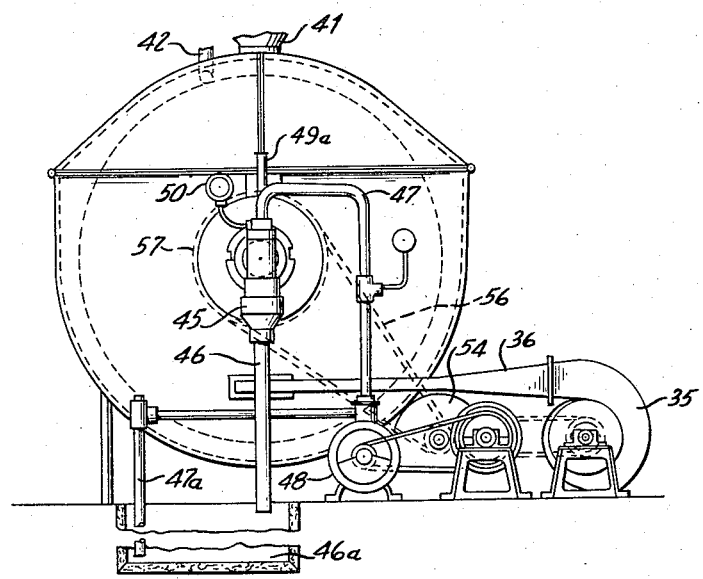
Fig. 1 shows the drier and some of its auxiliary devices in side elevation.
Figure 2:
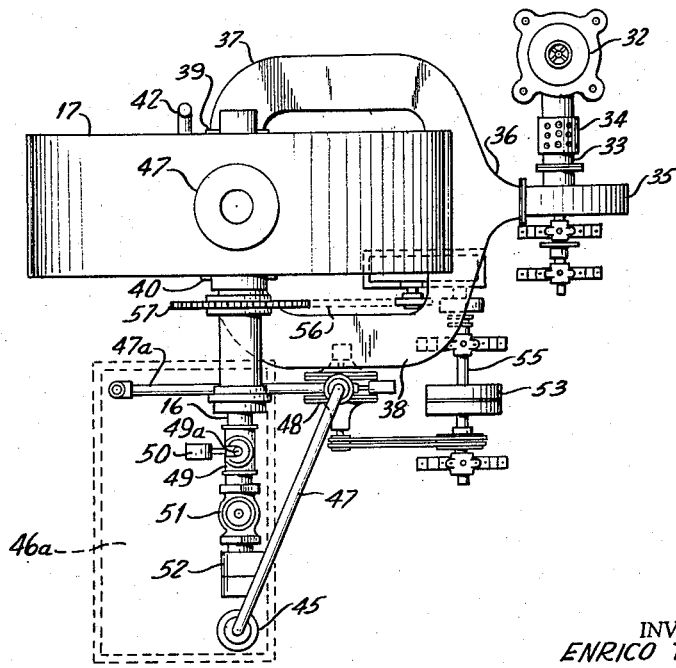
Fig. 2 shows the same in top view.
Figure 7:
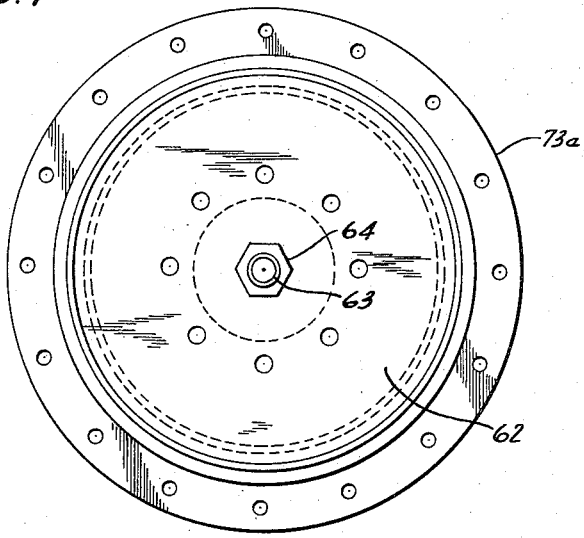
Fig. 7 is a face view of the manhole cover.
Figure 10:
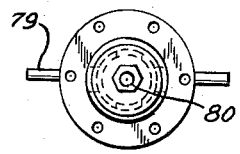
Fig. 10 shows the sampling cup in bottom view.
Figure 8:
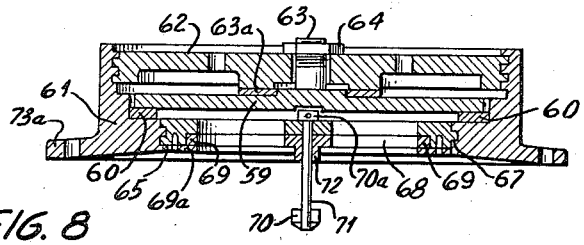
Fig. 8 is a sectional side view of the cover in place and adjacent parts.

In the form shown the coffee or other bean material is dried in a large drum 10 having flat ends 11 and 12 and a cylindrical face 13 shown as narrower than the diameter of the ends 11 and 12.

The drum 10 is shown as mounted on a stub shaft 14 turning in a bearing 16a in the double walled jacket 17 surrounding the drum 10.

In the form shown the stub shaft 14 forms a cup 18 at its inner end, and the cup 18 receives the closed reduced projecting end 19 of the fixed vacuum tube 16 which projects through the hollow rotating drive shaft 15, and turns radially at 20.

The connections to the ejector described below hold the vacuum tube 16 against revolving. For ease in assembling the tube 16 is formed in two flanged lengths 21 and 22 forming a joint at the flanges.

In the form shown the drum 10 is carried on the flanged brackets 23 and 24. The flange 23, bolted to the drum wall 11 carries the stub shaft 14, and the flange 24, bolted to the drum wall 12, carries the hollow drive shaft 15, which rotates the drum 10 as will be described below.

Coffee beans or other bean-like material may be delivered into the drum 10 through a closable manhole 25 in its cylindrical face 13, and the beans are prevented by agitation from being overheated within the rotating drum.

To effect this agitation the drum shown carries on the inner faces of its ends 11 and 12 inwardly projecting blades or vanes 26, 27, 28, 29.

In the form shown four vanes 26 are welded at an acute angle (say 55° to the tangent) to the inner face of the end 11 so their faces lie along the axis of the drum, and their inner ends terminate clear of the shaft 14, with the result that beans are caught in the acute angle and are carried upward and around until they drop off the vane 26 and spill on a radial vane 27 from the end of the vane 26 or spill near the end 11 off a cut-off edge 30 into the path of the next oncoming vane 26.

The radial vanes 27 are likewise shown welded to the end 11 and terminate clear of the shaft 14 so the beans drop past the shaft 14. Some of the beans caught by the radial vane drop off a cut-off edge 31 and fall near the end 11, and past the shaft 14 to the next on-coming vane 26.

In the form shown four such radial vanes 27 are spaced approximately equally between the angle-set vanes 26 and slightly overlap the circles of travel of the vanes 26. The radial vanes 27 cover nearly two thirds of the clear diameter between the shaft 14 and the face 13, and the angle set vanes 26 cover about one-third of that clear diameter.

The end 12 of the drum 10 is shown carrying angle set vanes 28, set at the opposite angle to those on the face 13, and radial vanes 29, set half way between the diameters on which the radial vanes 27 lie.

Thus, if the rotation of the drum 10 is reversed, the vanes 28 and 29 will carry and spill beans as the vanes 26 and 27 carried and spilled beans when turning as described above, and clear the shaft 15.

While the turning drum 10 thus lifts and spills the beans within it, the drum is externally heated by a burner diagrammatically shown at 32, usually an oil burner.

The burner 32 is shown as delivering its hot products of combustion through a horizontal conduit 33, suitably diluted with cool air, if desired, admitted at an adjustable valve diagrammatically shown at 34.

The conduit 33 carries the products of combustion to a blower 35 having a central intake and a delivery outlet 36 split into two smaller delivery conduits 37 and 38 adapted to deliver the hot products from the burner 32 to the opposite sides 39 and 40 of the jacket 17 about half way between the shaft 14 and the bottom of the jacket, or a little lower.

The jacket 17 is shown in Fig. 4 as spaced from the drum 10 both on its sides and top and bottom and includes a top hopper-like opening 41 serving as an opening for supplying beans to the drum 10 through its manhole 25 when that is open.

The side pipe 42 near the top of the casing 17 serves as vent for the combustion products of the burner 32.

To add heated area to the ends 11 and 12 of the drum 10 the drum may include relatively large radial hot air conduits 43 welded to the ends 11 and 12 near their flanges 23 and 24 and open at those ends, and bent to extend radially parallel to the ends 11 and 12 to the points 44 where they are welded to and open through the peripheral face 13.

Thus as the drum 10 revolves the conduits 43 tend to centrifugally carry part of the hot products of combustion through them and aid in drying the beans.

In the form shown many of the beans dropped from the vanes 26, 27, 28, 29, fall on the hot conduits 43 which are about in the path of the vanes and then fall further to the bottom of the drum 10.

A vacuum is continuously maintained in the drum 10 through the fixed tube 16 with the aid of a suitable packing 15a where the tube 16 emerges from the hollow drive shaft 15. To obtain this vacuum economically and simply, especially in regions remote from repair facilities, there is shown a water jet ejector diagrammatically shown at 45 with a vertical flow pipe 46 to carry off the used water to a reservoir 46a.

A pipe 47a is shown as carrying the exhaust water from the reservoir 46a to a pump 48 which supplies the operating water to the ejector 45 through the feed pipe 47.

The connections between the hollow tube 16 and the ejector 45 include a T joint 49 to provide connections to a thermometer 49a, a vacuum gauge 50, a hand valve 51 and a check valve 52.

The pump 48 and the blower 35 may be driven from a single motor or pulley 53 and through chain belt connections the pump 48 and the blower 35 and the drive shaft 55 may be connected through reducing gear 54 to carry a chain 56 driving the drum drive shaft 15 through a chain wheel 57 keyed to it.

To enable the tube 16 to maintain the needed vacuum and avoid the hazard of blocking it with beans, the tube 16 is connected at the turn to an upwardly projecting tube 58 extending radially of the drum, as shown in several figures.

The tube 58 is shown as terminating in a perforated head 59 rectangularly elongated circumferentially of the drum so that it lies wholly clear of the rotation of the vanes 26, 27, 28, and 29 and wholly clear of the conduits 43 and yet provides a large side and end area of perforations through which the vacuum draws air slowly.

In the form shown, the tube 58 is set at an angle of about 25° from the vertical so that it stands clear of any beans entering through the hopper 41 when a fresh lot of beans is being loaded.

The drum 10 may be unloaded by turning its manhole 25 to the bottom and opening it so the beans flow out through a bottom opening 84 in the jacket 17.

The manhole 25 is provided with a main door or circular plate 59 resting on packing 60 which lies on the frame 61 held to the face 13. The plate 59 is shown as covered by a large threaded flat plate 62 that screws down within the frame 61 and turns independently of the plate 59 but surrounds a boss 63 on the plate 59 and presses on the bronze ring 63a surrounding the boss 63 thus keeping the plate 59 tightly pressed against the packing 60. A nut 64 may be screwed down on the threaded boss 63 to hold the plates 59 and 62.

Below the plate 59 lies an outwardly threaded inner door plate 65, cut away at four segments 66, to provide openings into the interior of the drum 10, and held by its thread 67 in the frame 61.

Figure 9:
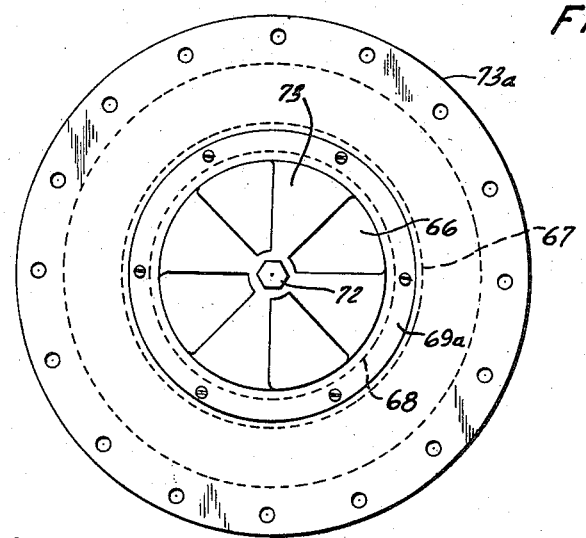
Fig. 9 is a bottom view of parts below the cover of Fig. 8.
Figure 12:
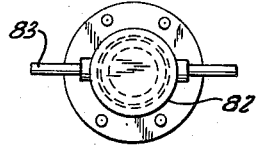
Fig. 12 is a view of the parts of Fig. 11 as seen from the outside of the drum.

These four segments 66 are adapted to be closed by a diaphragm or shutter 68 lying below the inner door plate 65, held in its place by the ring 69a and rotatable on a ledge 69 of the door plate 65. To close or open the segments 66 the shutter 68 may be rotated by drawing outwardly a pronged end 70 of the rod 71 formed as a hollow nut so that it fits over a nut 72 secured centrally of the shutter 68 and the rod 71 may then lift the shutter 68 slightly if need be and rotate it so that its closed sectors 73 fit over the open segments 66 of the plate 65. In Fig. 9, the segments 60 are shown open.

Thus the flow of beans in or out of the drum 10 may be controlled and permitted or stopped.

The rod 71 is preferably long enough to extend well beyond any flange 73a of the frame 61, and may be then turned by a long rod (not shown) passing through a radial aperture 70a in the rod 71, thus enabling the shutter to be turned at will even if beans are flowing through the manhole 25.

To enable samples of beans to be withdrawn while being dried without breaking the vacuum there is provided a vacuum device including a hood 74 formed on the inner wall of the drum 10 in which is rotatable a sampling cylinder 75 having a side opening 76 large enough to permit beans to enter freely and normally closed by the slightly tapering nearly cylindrical wall 77 of the hood 74.

The sampling cylinder 75 may be rotated in the hood 74 to cause its opening 76 to register with a side opening 78 of the hood wall 77, thus allowing beans to enter the device. To cause the sampling cylinder 75 to thus rotate it is provided with side handles 79 which turn it on its bolt pivot 80 at the top of the hood. Such turning is permitted by its top corner packing 81.

When a sufficient bean sample has entered the sampling cylinder 75 it may be rotated back to its normal position closing the opening 76 by the side wall 77.

Then the contained sample may be withdrawn by rotating and removing the cup 82 into which the beans have fallen, rotating the cup 82 by the handles 83.

Figure 11:
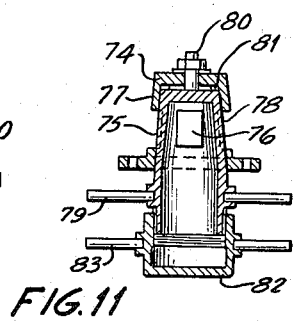
Fig. 11 is a sectional side view of the cup and its assembly.

Fig. 11 shows the sampling device 75 and the sample is preferably taken through the bottom opening 84 of the jacket 17.

Having thus described one form of the invention, what is claimed is:

1. A dryer suitable for coffee beans consisting of a rotatable drum having closed ends with apertures and a peripheral wall with apertures, a jacket spaced from the drum adapted to pass hot air around the drum, a fixed hollow axle on which the drum ratates, means for maintaining a vacuum within said axle, duct means extending radially from said hollow axle communicating with the interior of the drum through said hollow axle to said vacuum maintaining means for conveying air and vapor exteriorly of the drum, vanes fixed to an end of the drum and each extending axially part way toward the opposite end and at an angle to the radius and adapted to pick up and drop the contents of the drum as the drum rotates, hollow pipes within the drum each having one open end communicating with an aperture in the end of the drum and one open end communicating with an aperture in the peripheral wall, the closed length of the pipe lying in the path of vanes as the drum rotates, so that drum contents dropped by a travelling vane fall upon a pipe body.

2. A dryer suitable for coffee beans consisting of a rotatable drum having closed ends with apertures and a peripheral wall with apertures, a jacket spaced from the drum adapted to pass hot air around the drum, a fixed hollow axle on which the drum rotates, means for maintaining a vacuum within said axle, duct means extending radially from said hollow axle communicating with the interior of the drum through said hollow axle to said vacuum maintaining means for conveying air and vapor exteriorily of the drum, vanes fixed to an end of the drum and each extending axially part way toward the opposite end and at an angle to the radius and adapted to pick up and drop the contents of the drum as the drum rotates, hollow pipes within the drum each having one open end communicating with an aperture in the end of the drum and one open end communicating with an aperture in the peripheral wall, the closed length of the pipe lying in the path of vanes as the drum rotates, so that drum contents dropped by a travelling vane fall upon a pipe body, other hollow pipes within the drum each having one open end communicating with an aperture in the opposite end of the drum and one open end communicating with an aperture in the peripheral wall, and a second set of vanes fixed to said opposite end of the drum each extending axially part way toward the opposite end and at an angle to the radius and adapted to pick up drum contents and drop the drum contents on said other pipes.

3. A dryer suitable for coffee beans consisting of a rotatable drum having closed ends with apertures and a peripheral wall with apertures, a jacket spaced from the drum adapted to pass hot air around the drum, a fixed hollow axle on which the drum rotates, means for maintaining a vacuum within said axle, duct means extending radially from said hollow axle communicating with the interior of the drum through said hollow axle to said vacuum maintaining means for conveying air and vapor exteriorly of the drum, vanes fixed to an end of the drum and each extending axially part way toward the opposite end and at an angle to the radius and adapted to pick up and drop the contents of the drum as the drum rotates, hollow pipes within the drum each having one open end communicating with an aperture in the end of the drum and one open end communicating with an aperture in the peripheral wall, the closed length of the pipe lying in the path of vanes as the drum rotates, so that drum contents dropped by a travelling vane fall upon a pipe body, and other radial vanes fixed to the end of the drum between the angle set vanes adapted to pick up and drop the drum contents on the pipes as the drum rotates.

4. A dryer suitable for coffee beans consisting of a rotatable drum having closed ends with apertures and a peripheral wall with apertures, a jacket spaced from the drum adapted to pass hot air around the drum, a fixed hollow axle on which the drum rotates, means for maintaining a vacuum within said axle, duct means extending radially from said hollow axle communicating with the interior of the drum through said hollow axle to said vacuum maintaining means for conveying air and vapor exteriorly of the drum, vanes fixed to an end of the drum and each extending axially part way toward the opposite end and at an angle to the radius and adapted to pick up and drop the contents of the drum as the drum rotates, hollow pipes within the drum each having one open end communicating with on aperture in one of the drum and one open end communicating with an aperture in the peripheral wall, the closed length of the pipe lying in the path of vanes as the drum rotates, so that drum contents dropped by a travelling vane fall upon a pipe body, other hollow pipes within the drum each having an open end communicating with on aperture in the opposite end of the drum and one open end communicating with an aperture in the peripheral wall and a second set of vanes fixed to said opposite end of the drum each extending axially part way toward the opposite end and at an angle to the radius and adapted to pick up drum contents and drop the drum contents on said other pipes, said vanes being of substantial width where attached and tapering to lesser width as they approach their outer ends.

5. A dryer suitable for coffee beans consisting of a rotatable drum having closed ends with apertures in one end and a peripheral wall with apertures, a jacket spaced from the drum adapted to pass hot air around the drum, a fixed hollow axle on which the drum rotates, means for maintaining a vacuum within said axle, duct means extending radially from said hollow axle communicating with the interior of the drum through said hollow axle to said vacuum maintaining means for conveying air and vapor exteriorly of the drum, vanes fixed to an end of the drum and each extending axially part way toward the opposite end and at an angle to the radius and adapted to pick up and drop the contents of the drum as the drum rotates, hollow pipes within the drum each having one open end communicating with an aperture in one end of the drum and one open end communicating with an aperture in the peripheral wall, the closed length of the pipe lying in the path of vanes as the drum rotates, so that drum contents dropped by a travelling vane fall upon a pipe body, and other radial vanes fixed to the end of the drum between the angle set vanes adapted to pick up and drop the drum contents on the pipes as the drum rotates, said vanes being of substantial width where attached and tapering to lesser width as they approach their outer ends.

References Cited in the file of this patent

UNITED STATES PATENTS

| | | |
|---|---|---|
| 565,720 | Brown | Aug. 11, 1896 |
| 661,568 | Walter | Nov. 13, 1900 |
| 764,226 | Cottrell | July 5, 1904 |
| 872,084 | Rooney | Nov. 26, 1907 |
| 1,012,293 | Talbutt | Dec. 19, 1911 |
| 1,299,254 | Stamp | Apr. 1, 1919 |
| 1,436,862 | Cretors | Nov. 28, 1922 |
| 2,023,468 | Dietrich | Dec. 10, 1935 |
| 2,024,062 | Preedit | Dec. 10, 1935 |
| 2,503,448 | Morris | Apr. 11, 1950 |
| 2,611,976 | Reiter et al. | Sept. 30, 1952 |

FOREIGN PATENTS

| | | |
|---|---|---|
| 114,700 | Great Britain | Apr. 18, 1918 |